United States Patent
Chen

[11] Patent Number: 6,145,937
[45] Date of Patent: Nov. 14, 2000

[54] BICYCLE WHEEL RIM

[75] Inventor: Chao-Ying Chen, Tainan Hsien, Taiwan

[73] Assignee: Alex Machine Industrial Co., Ltd., Tainan Hsien, Taiwan

[21] Appl. No.: 09/351,858

[22] Filed: Jul. 13, 1999

[51] Int. Cl.[7] .............................. B60B 1/02; B60B 21/00
[52] U.S. Cl. ............................................... 301/58; 301/95
[58] Field of Search ................................. 301/95, 96, 97, 301/98, 55, 58, 61, 104, 57, 5.1; 152/427, 428

[56] References Cited

U.S. PATENT DOCUMENTS

| | | | |
|---|---|---|---|
| 365,091 | 6/1887 | Owen | 152/246 |
| 486,146 | 11/1892 | Westwood et al. | 301/97 |
| 607,201 | 7/1898 | Waggoner | 301/96 |
| 1,122,012 | 12/1914 | Loomis | 152/401 |
| 1,820,857 | 8/1931 | Wilson | 152/381.3 |
| 2,034,360 | 3/1936 | Sill | 301/96 |
| 3,933,392 | 1/1976 | Wells | 301/98 |
| 4,108,232 | 8/1978 | Simpson | 152/365 |
| 4,531,754 | 7/1985 | Engleman | 301/98 |
| 4,626,036 | 12/1986 | Hinsberg et al. | 301/58 |
| 5,061,013 | 10/1991 | Hed et al. | 301/95 |
| 5,228,756 | 7/1993 | Krampera | 301/95 |
| 5,249,846 | 10/1993 | Martin et al. | 301/95 |
| 5,490,719 | 2/1996 | Lew | 301/5.1 |
| 5,499,864 | 3/1996 | Klein et al. | 301/97 |
| 5,509,438 | 4/1996 | Leonard et al. | 152/427 |
| 5,651,591 | 7/1997 | Mercat et al. | 301/58 |
| 5,653,510 | 8/1997 | Osborne | 301/95 |
| 5,746,850 | 5/1998 | Luscher et al. | 152/339.1 |
| 5,975,646 | 11/1999 | Campagnolo | 301/95 |

*Primary Examiner*—S. Joseph Morano
*Assistant Examiner*—Long Bao Nguyen
*Attorney, Agent, or Firm*—Akin, Gump, Strauss, Hauer & Feld, L.L.P.

[57] ABSTRACT

A bicycle wheel rim includes an annular rim body having spaced left and right annular tire retaining walls adapted for retaining a bicycle tire therebetween, and an annular connecting wall interconnecting the tire retaining walls and cooperating with the tire retaining walls so as to confine a tire receiving space thereamong. A spoke mounting seat extends from the rim body and is disposed outwardly of the tire receiving space. The spoke mounting seat is formed with a plurality of spoke fastening holes therethrough for mounting of the spokes thereon.

8 Claims, 8 Drawing Sheets

BICYCLE WHEEL RIM

BACKGROUND OF THE INVENTION

1. Field of the Invention

The invention relates to a bicycle wheel rim, more particularly to an airtight bicycle wheel rim.

2. Description of the Related Art

A conventional bicycle wheel rim is generally formed from an elongated metal strip by bending the strip into an annular shape and subsequently connecting two opposite ends of the strip. Referring to FIGS. 1 and 2, a conventional bicycle wheel rim 1 is shown to include spaced left and right tire retaining walls 12 and a spoke mounting wall 11 interconnecting inner edges of the tire retaining walls 12. The spoke mounting wall 11 cooperates with the tire retaining walls 12 to form a tire receiving space 4 thereamong, and is formed with a plurality of spoke fastening holes 10 that are slightly staggered and that are arranged generally along a central portion of the spoke mounting wall 11 for mounting of spoke fasteners 2 thereon. Each spoke fastener 2 has an internally threaded shank portion 20 for connecting threadedly with one end of a corresponding spoke 31. As shown in FIG. 3, the spokes 31 mount the bicycle wheel rim 1 on two opposite ends 30 of a hub 3.

Some of the drawbacks of the conventional bicycle wheel rim 1 are as follows:

1. Because the spoke fastening holes 10 are formed in the central portion of the spoke mounting wall 11, air in the tire receiving space 4 can easily leak out of the wheel rim 1 via the spoke fastening holes 10.
2. To prevent undesired deflation due to the presence of the spoke fastening holes 10 in the central portion of the spoke mounting wall 11, a two-layer tire that includes an inner tire 41 and an outer tire 42 is employed. Air is confined within the inner tire 41, whereas the outer tire 42 engages the tire retaining walls 12 so as to retain the inner tire 41 in the tire receiving space 4. Extra costs are thus incurred due to the use of the two-layer tire.
3. The head portion 21 of each spoke fastener 20 extends into the tire receiving space 4. As such, an additional lining 43 is needed to prevent damage to the inner tire 41 due to direct contact between the spoke fasteners 20 and the inner tire 41.

SUMMARY OF THE INVENTION

Therefore, the object of the present invention is to provide a bicycle wheel rim which can overcome the aforesaid drawbacks that are commonly associated with the prior art.

According to this invention, a bicycle wheel rim is adapted for mounting a plurality of spokes thereon, and comprises an annular rim body and a spoke mounting seat. The rim body includes spaced left and right annular tire retaining walls adapted for retaining a bicycle tire therebetween, and an annular connecting wall interconnecting the tire retaining walls and cooperating with the tire retaining walls so as to confine a tire receiving space thereamong. The spoke mounting seat extends from the rim body and is disposed outwardly of the tire receiving space. The spoke mounting seat is formed with a plurality of spoke fastening holes therethrough for mounting of the spokes thereon.

In one embodiment, the spoke mounting seat includes left and right spoke mounting flanges that extend respectively from left and right sides of the connecting wall. In another embodiment, the spoke mounting seat includes a radial spoke mounting flange that extends from the connecting wall in a radial inward direction toward a central axis of the rim body. In a further embodiment, the spoke mounting seat includes left and right spoke mounting flanges, each of which extends from a respective one of the tire retaining walls.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
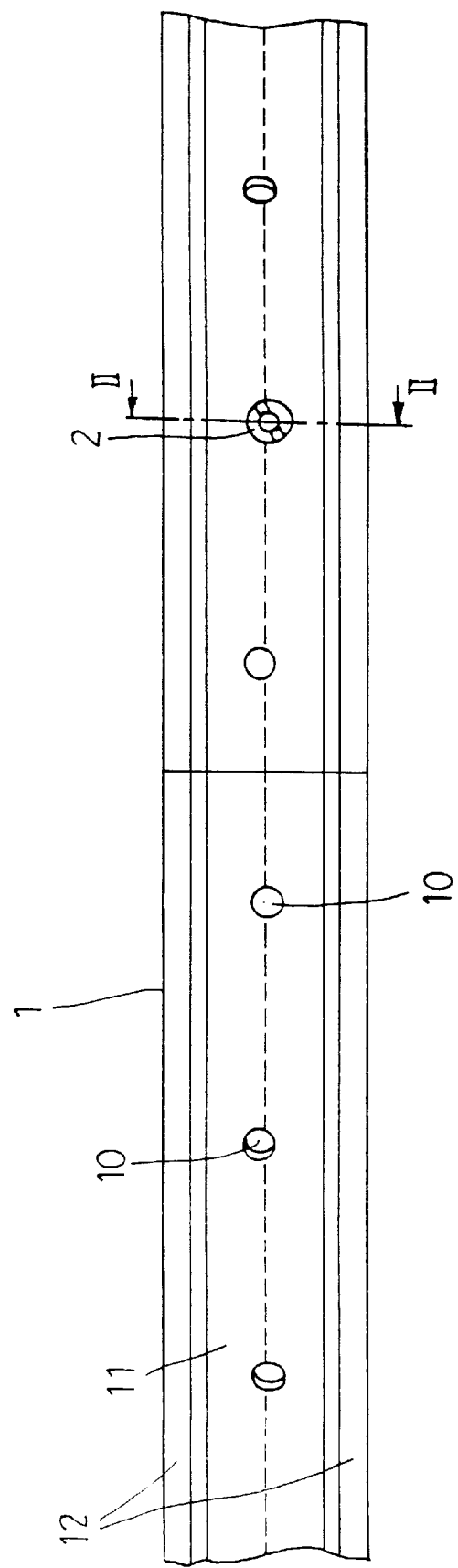
FIG. 1 is a fragmentary schematic top view illustrating a conventional bicycle wheel rim.
Figure 2:
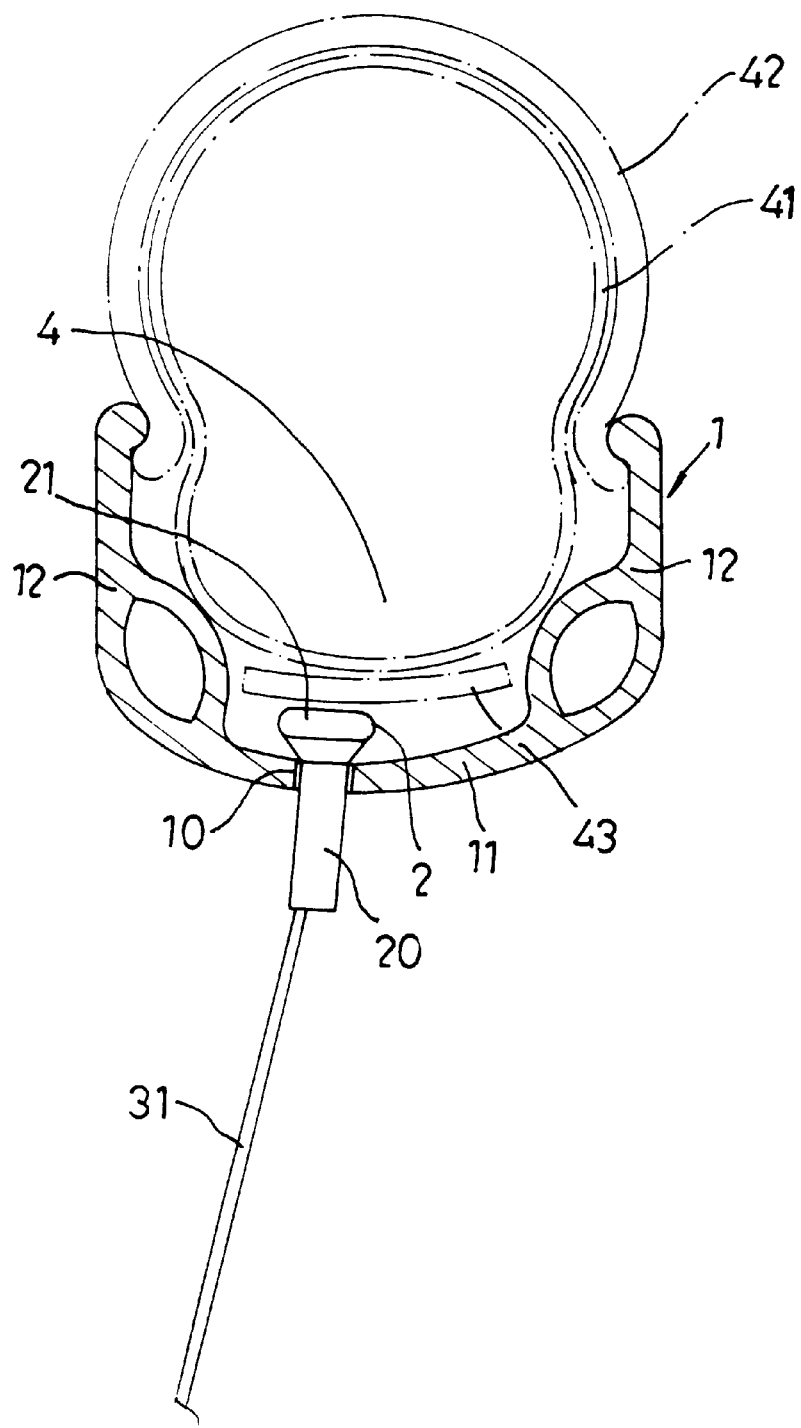
FIG. 2 is an enlarged fragmentary sectional view illustrating the conventional bicycle wheel rim, taken along lines II—II in FIG. 1.
Figure 3:
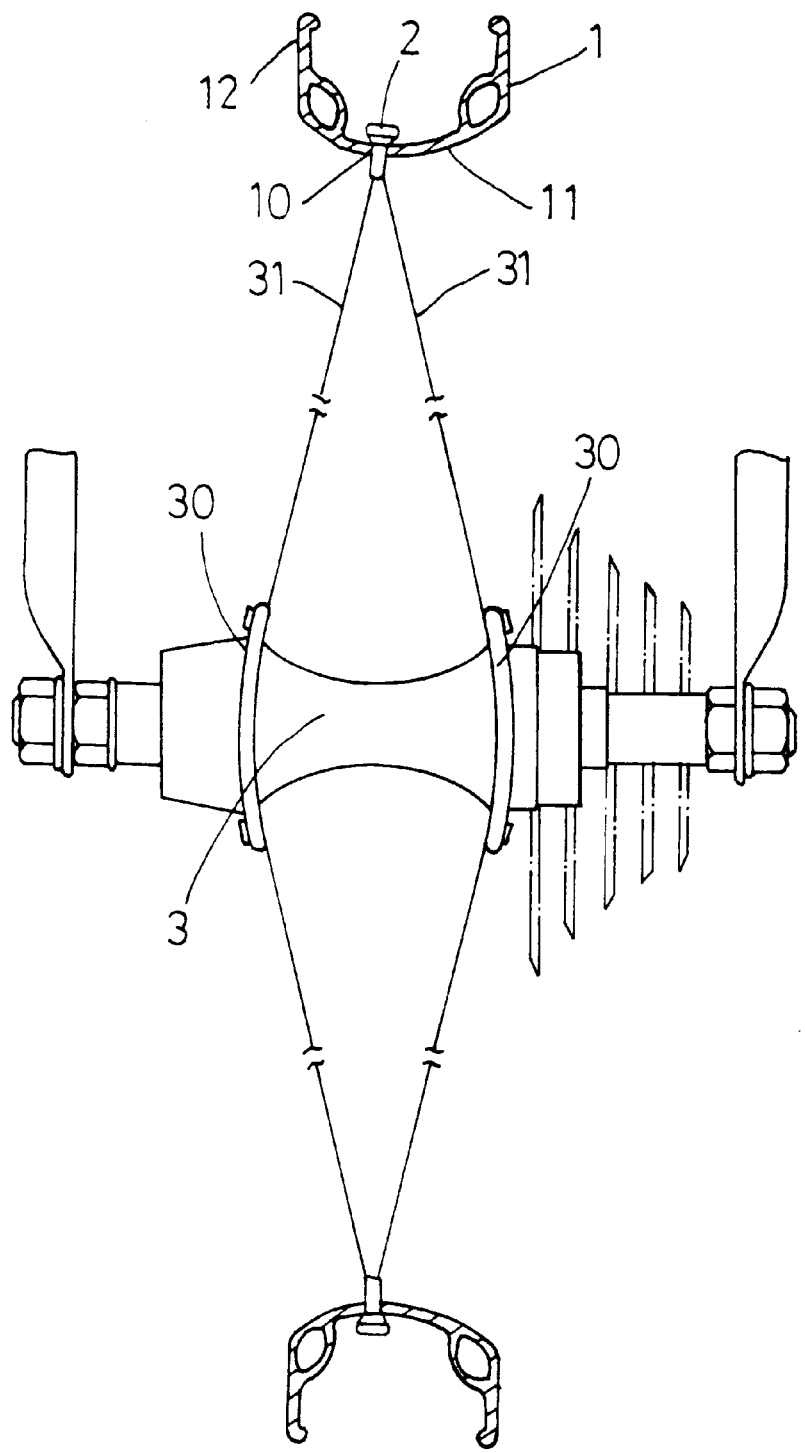
FIG. 3 is a schematic partly sectional view illustrating the conventional bicycle wheel rim when mounted on a hub to form a bicycle wheel.
Figure 4:
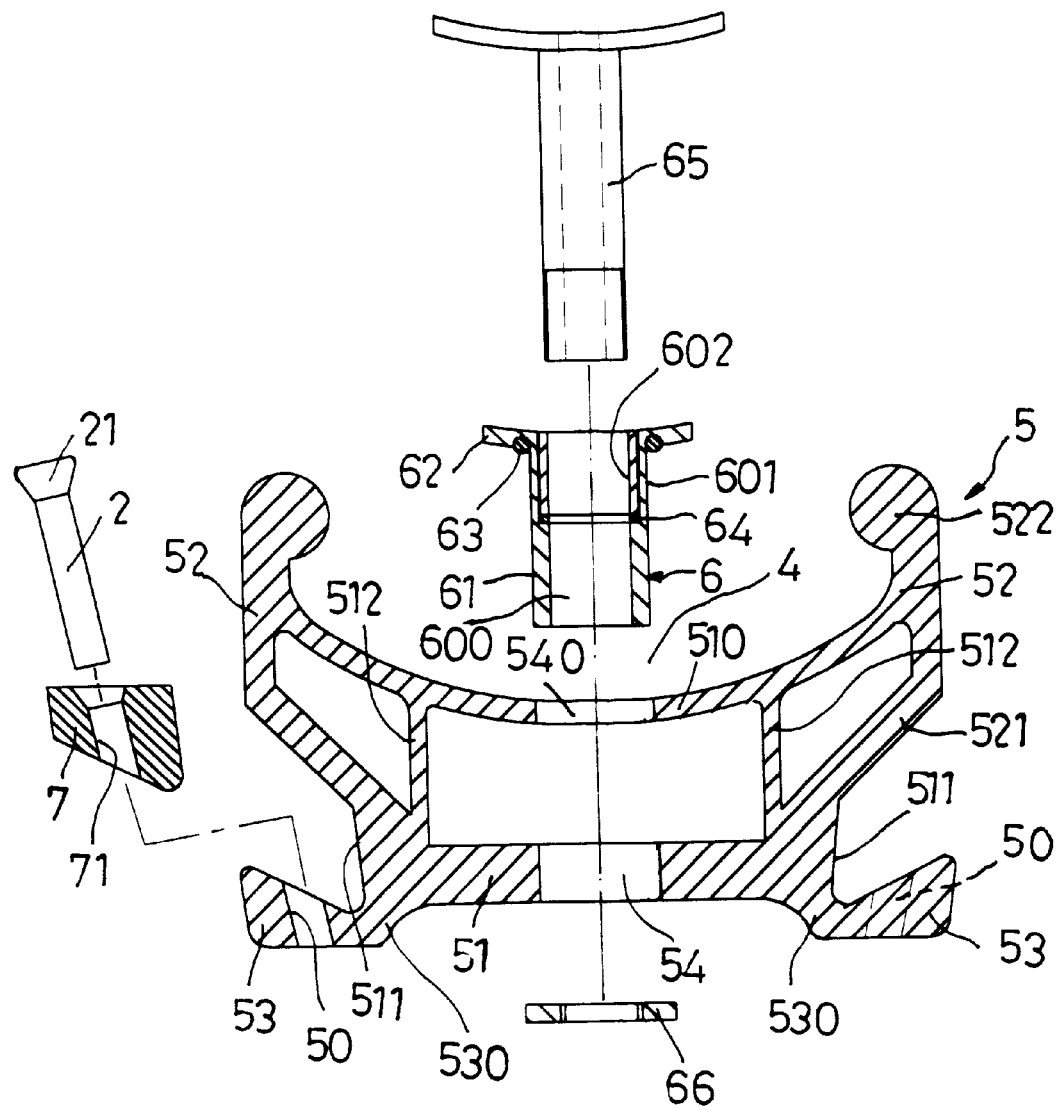
FIG. 4 is an enlarged exploded fragmentary sectional view illustrating the first preferred embodiment of a bicycle wheel rim according to the present invention.
Figure 5:
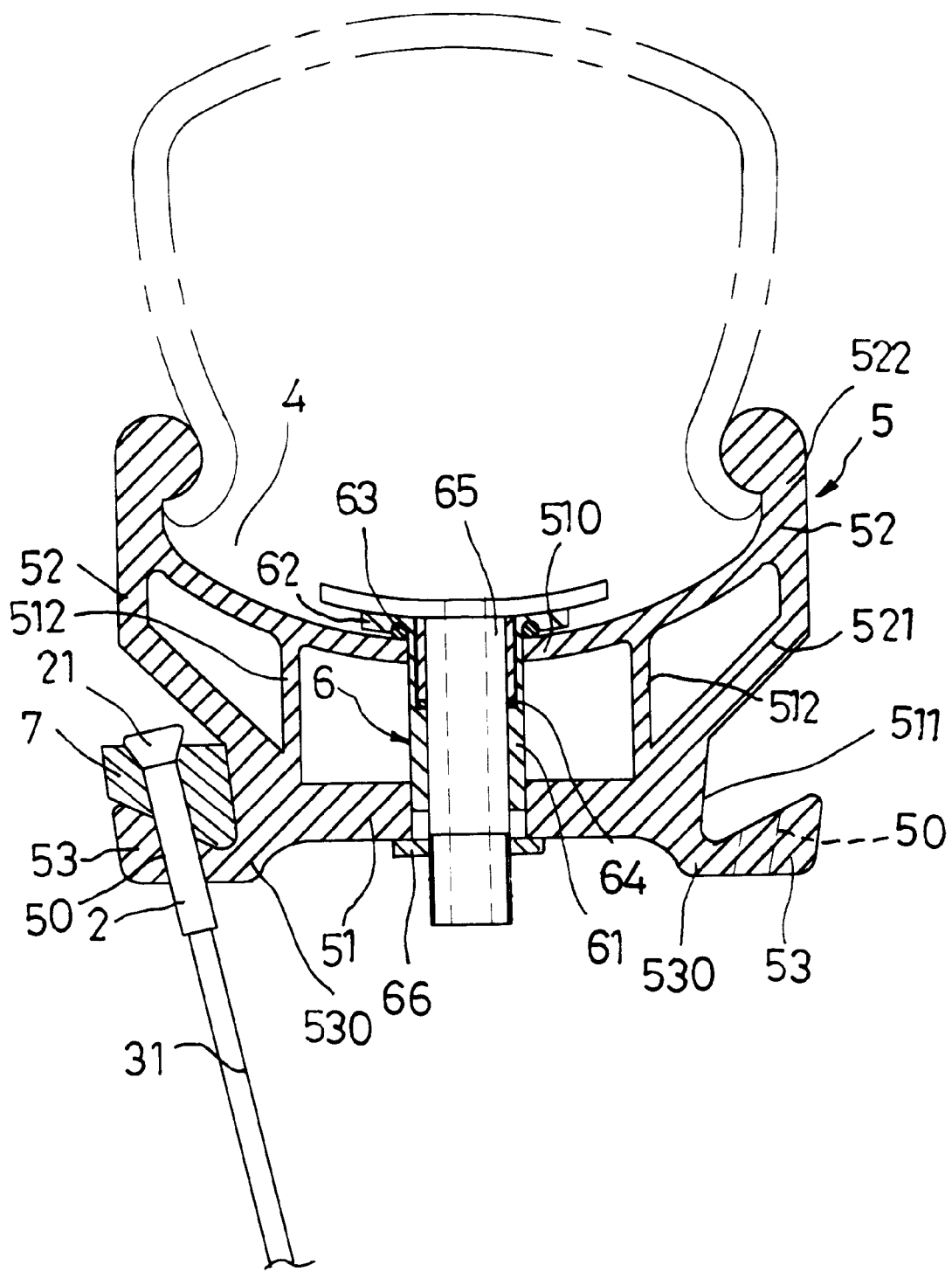
FIG. 5 is an enlarged assembled fragmentary sectional view illustrating the first preferred embodiment.
Figure 6:
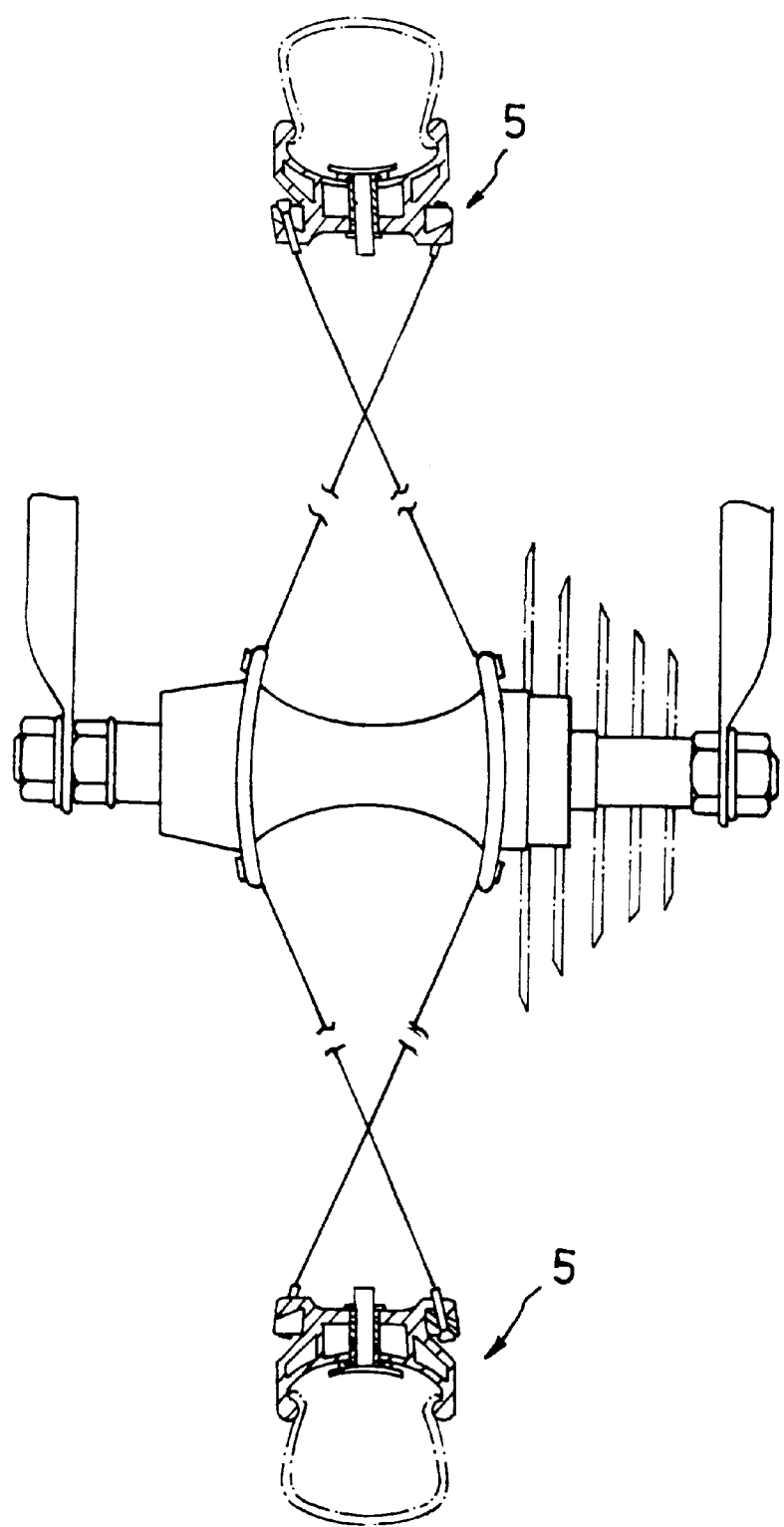
FIG. 6 is a schematic partly sectional view illustrating the first preferred embodiment when mounted on a hub to form a bicycle wheel.

Referring to FIGS. 4 to 6, the first preferred embodiment of a bicycle wheel rim 5 according to the present invention is adapted for mounting a plurality of spokes 31 thereon by means of spoke fasteners 2 and is shown to include a rim body having spaced left and right annular tire retaining walls 52, an annular connecting wall 51, and an annular bridging wall 510.

The tire retaining walls 52 are adapted for retaining a bicycle tire therebetween. Each of the tire retaining walls 52 has an inner edge proximate to a central axis of the rim body, and an outer edge distal to the central axis of the rim body. In this embodiment, each of the tire retaining walls 52 has an inclined inner section 521 that extends radially outward relative to the central axis of the rim body and away from the inner section 521 of the other one of the tire retaining walls 52, and an outer section 522 that extends from the inner section 521 and that is generally parallel to the outer section 521 of the other one of the tire retaining walls 52.

The connecting wall 51 interconnects the inner edges of the tire retaining walls 52, and cooperates with the tire retaining walls 52 so as to confine a tire receiving space 4 thereamong.

The bridging wall 510 surrounds the connecting wall 51, and interconnects the outer sections 522 of the tire retaining walls 52. A pair of reinforcing walls 512 interconnects the bridging wall 510 and the connecting wall 51.

The bicycle wheel rim 5 of the present invention is characterized by a spoke mounting seat that extends from the rim body and that is disposed outwardly of the tire receiving space 4. In this embodiment, the spoke mounting seat includes left and right spoke mounting flanges 53 that extend laterally and respectively from left and right sides 511 of the connecting wall 51 and that are formed with spoke fastening holes 50 therethrough for mounting of the spokes 31 thereon. Since the spoke mounting flanges 53 are disposed outwardly of the tire receiving space 4, air in the tire receiving space 4 cannot leak out via the spoke fastening holes 50.

In order to dispense with the need for an inner tire, the bicycle wheel rim 5 further comprises an air valve assembly that includes a known inflating air valve 65 and a valve mounting seat 6 for mounting the air valve 65 on the rim body. The air valve assembly is adapted to be operated for inflating air into the tire receiving space 4. In this embodiment, the bridging wall 510 and the connecting wall 51 are formed with aligned valve mounting holes 540, 54. The valve mounting unit 6 includes a mounting seat having a tubular portion 61 that extends through the valve mounting hole 540 of the bridging wall 510 toward the connecting wall 51, and a seat portion 62 that extends radially outward from one end of the tubular portion 61 and that is disposed on one side of the bridging wall 510 opposite to the connecting wall 51. The mounting seat confines a valve hole 600 for passage of the air valve 65 therethrough through the mounting seat and the valve mounting hole 54 of the connecting wall 51. The air valve 65 depresses the seat portion 62 against the bridging wall 510 when passed through the tubular portion 61. A first seal ring 63 is disposed around the tubular portion 61 and is disposed between the seat portion 62 and the bridging wall 510 to prevent leakage of air out of the tire receiving space 4 via the valve mounting hole 540. A second seal ring 64 is disposed around the air valve 65 and is in tight contact with the tubular portion 61 inside the valve hole 600, thereby preventing the leakage of air out of the tire receiving space 4 via the valve hole 600. A nut fastener 66 engages threadedly an external screw thread formed on one end of the air valve 65 that extends through the valve mounting hole 54 in the connecting wall 51, and abuts tightly against one side of the connecting wall 51 opposite to the bridging wall 510. The nut fastener 66, together with the external screw thread on the air valve 65, constitutes a screw fastener unit for retaining the air valve 65 on the connecting wall 51. Moreover, in order to facilitate installation of the second seal ring 64 inside the valve hole 600, the valve hole 600 is formed with an internally threaded wider section 601, thereby forming a shoulder for positioning the second seal ring 64 thereon. An externally threaded tubular retainer 602 engages the wider section 601 and prevents removal of the second seal ring 64 from the valve hole 600.

As mentioned beforehand, the spokes 31 are fastened to the bicycle wheel rim 5 with the use of the spoke fasteners 2. The spoke fasteners 2 have enlarged head portions 21. To prevent breakage of the spoke mounting flanges 53 due to the tension of the spokes 31, there is provided a plurality of cushioning blocks 7. Each of the cushioning blocks 7 is disposed on one of the spoke mounting flanges 53 and abuts against an adjacent one of the left and right sides 511 of the connecting wall 51. Each of the cushioning blocks 7 is formed with a fastener hole 71 that is registered with one of the spoke fastening holes 50 and that is adapted for passage of one of the spoke fasteners 2 therethrough and for seating the head portion 21 of the corresponding spoke fastener 2 thereon, thereby transmitting a portion of the force of the spokes 31 to the connecting wall 51 in order to minimize breaking of the spoke mounting flanges 53 at a joint 530 thereof with the connecting wall 51.

Figure 7:
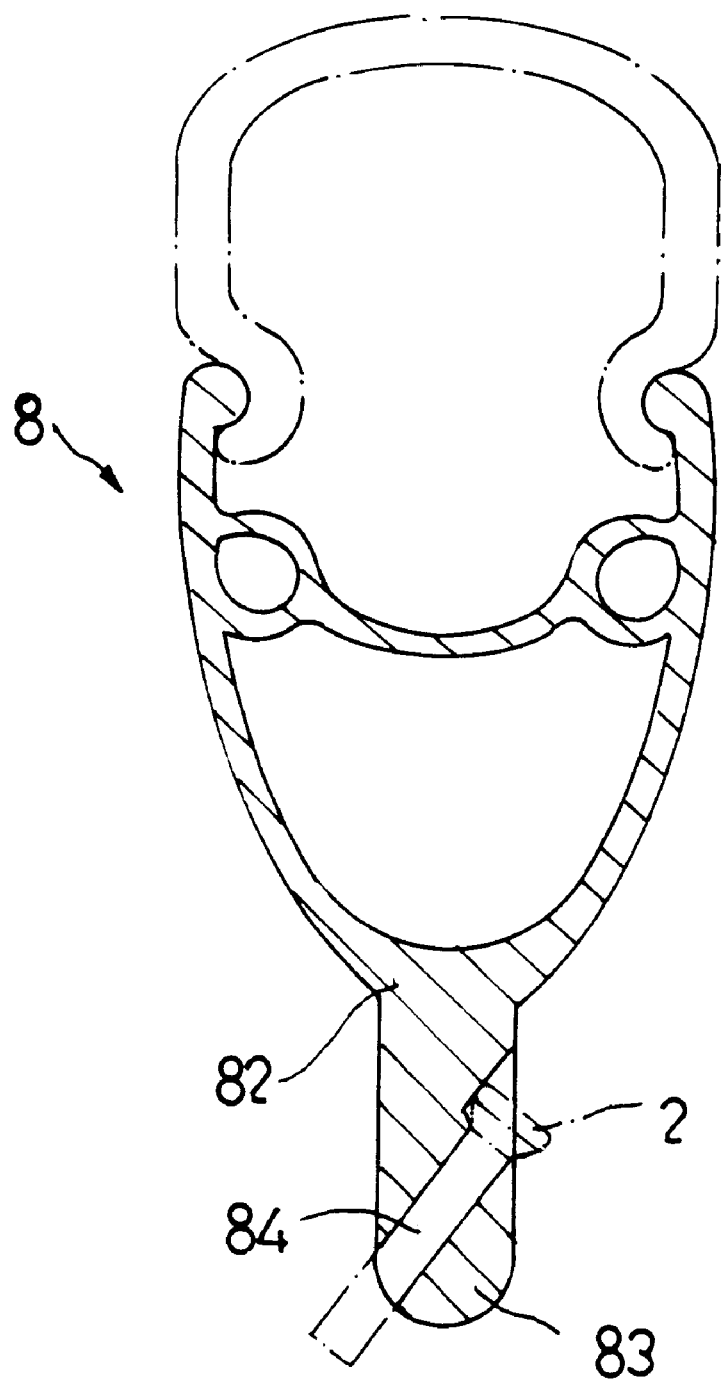
FIG. 7 is an enlarged fragmentary sectional view illustrating the second preferred embodiment of a bicycle wheel rim according to the present invention.

FIG. 7 illustrates the second preferred embodiment of a bicycle wheel rim 8 according to this invention. Unlike the previous embodiment, the spoke mounting seat includes a radial spoke mounting flange 83 that extends from the connecting wall 82 in a radial inward direction toward a central axis of the rim body and that is formed with the spoke fastener holes 84 therethrough for engaging the spoke fasteners 2. The spoke fastener holes 84 are inclined with respect to the central axis of the rim body.

Figure 8:
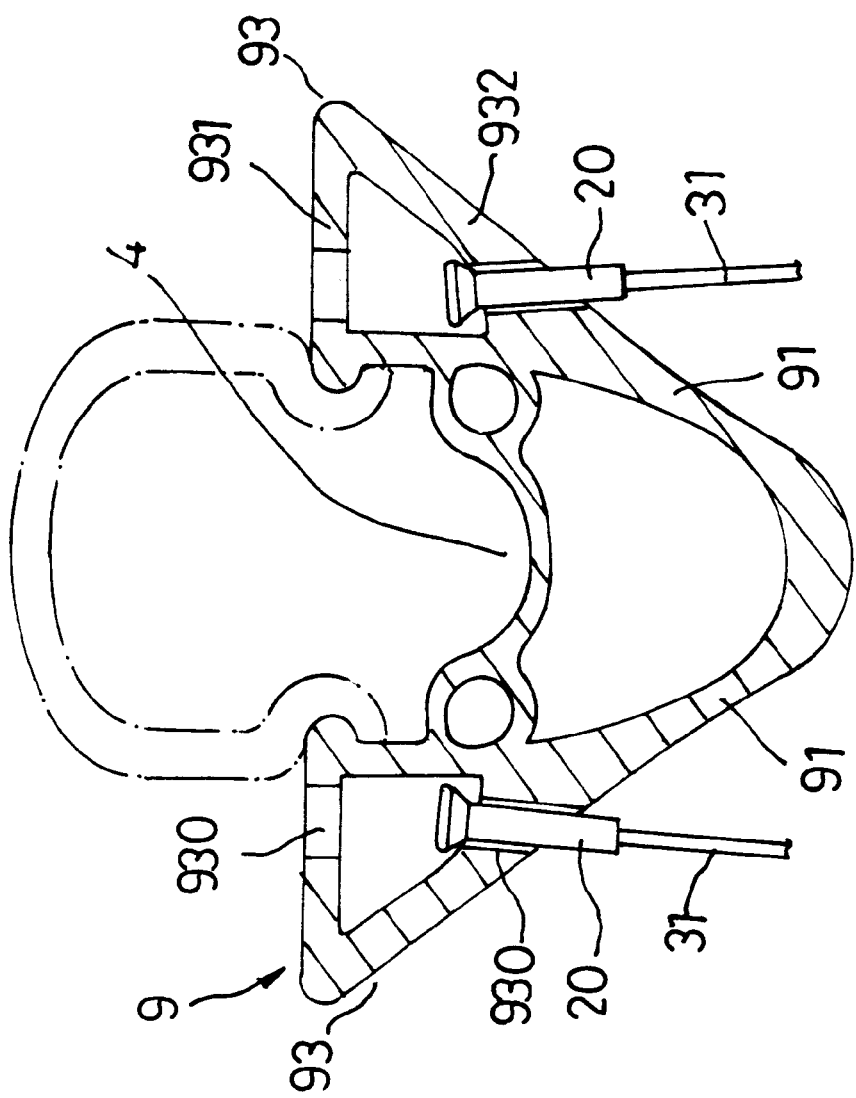
FIG. 8 is an enlarged fragmentary sectional view illustrating the third preferred embodiment of a bicycle wheel rim according to the present invention.

FIG. 8 illustrates the third preferred embodiment of a bicycle wheel rim according to this invention. In this embodiment, the spoke mounting seat includes left and right spoke mounting flanges 93, each of which extends from a respective one of the tire retaining walls 91. Each of the spoke mounting flanges 93 includes a lateral portion 931 that extends laterally from the outer edge of the respective tire retaining wall 91 and outwardly of the tire receiving space 4, and an inclined portion 932 that interconnects a distal end of the lateral portion 931 and an intermediate portion of the respective tire retaining wall 91. The lateral portion 931 and the inclined portion 932 are formed with aligned spoke fastening holes 930 for passage and retention of the spoke fasteners 20. Aside from providing a structure for mounting of the spokes 31 on the bicycle wheel rim 9, the spoke mounting flanges 93 further serve to reinforce the tire retaining walls 91.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A bicycle wheel rim for mounting a plurality of spokes thereon, comprising:

an annular rim body including:
spaced left and right annular tire retaining walls adapted for retaining a bicycle tire therebetween,
an annular connecting wall interconnecting said tire retaining walls and cooperating with said tire retaining walls so as to confine a tire receiving space thereamong;
an annular bridging wall surrounding said connecting wall and interconnecting said tire retaining walls, said bridging wall and said connecting wall include aligned valve mounting holes; and
an air valve assembly that includes an inflating air valve and a valve mounting unit for mounting said inflating air valve on said rim body, said valve mounting unit including:
a mounting seat having a tubular portion extending through said valve mounting hole of said bridging wall toward said connecting wall, and a seat portion extending radially outward from one end of said tubular portion and disposed on one side of said bridging wall opposite to said connecting wall, said mounting seat confining a valve hole for passage of said air valve therethrough through said mounting seat and said valve mounting hole of said connecting wall, said air valve depressing said seat portion against said bridging wall when passed through said tubular portion;
a first seal rim disposed around said tubular portion and disposed between said seat portion and said bridging wall, and
screw fastener means for retaining said air valve on said connecting wall; and a spoke mounting seat extending from said rim body and disposed outwardly of said tire receiving space, said spoke mounting seat being formed with a plurality of spoke fastening holes therethrough for mounting of the spokes thereon.

2. The bicycle wheel rim as claimed in claim 1, wherein:

each of said tire retaining walls has an inner edge proximate to a central axis of said rim body, and an outer edge distal to said central axis of said rim body, said connecting wall interconnecting said inner edges of said tire retaining walls, said spoke mounting seat including left and right spoke mounting flanges that extend respectively from left and right sides of said connecting wall and that are formed with said spoke fastening holes therethrough.

3. The bicycle wheel rim as claimed in claim 2, wherein said left and right spoke mounting flanges extend laterally and respectively from said left and right sides of said connecting wall.

4. The bicycle wheel rim as claimed in claim 3, wherein each of said tire retaining walls has an inclined inner section that extends radially outward relative to said central axis of said rim body and away from said inner section of the other one of said tire retaining walls, and an outer section that extends from said inner section and that is generally parallel to said outer section of the other one of said tire retaining walls.

5. The bicycle wheel rim as claimed in claim 3, the spokes being fastened to said bicycle wheel rim by spoke fasteners with enlarged head portions, said bicycle wheel rim further comprising a plurality of cushioning blocks, each of which is disposed on one of said left and right spoke mounting flanges and abuts against an adjacent one of said left and right sides of said connecting wall, each of said cushioning blocks being formed with a fastener hole registered with one of said spoke fastening holes and adapted for passage of one of the spoke fasteners therethrough and for seating the head portion of said one of the spoke fasteners thereon.

6. The bicycle wheel rim as claimed in claim 1, wherein said valve mounting unit further includes a second seal ring disposed around said air valve and in tight contact with said tubular portion inside said valve hole.

7. The bicycle wheel rim as claimed in claim 1, wherein said screw fastener means includes an external screw thread formed on one end of said air valve that extends through said valve mounting hole in said connecting wall, and a nut fastener engaging threadedly said external screw thread and abutting tightly against one side of said connecting wall opposite to said bridging wall.

8. A bicycle wheel rim for mounting a plurality of spokes thereon, comprising:

an annular rim body including spaced left and right annular tire retaining walls adapted for retaining a bicycle tire therebetween, each of said tire retaining walls having an inner edge proximate to a central axis of said rim body, an outer edge distal to said central axis of said rim body, and an intermediate portion between said inner and outer edges, said rim body further including an annular connecting wall interconnecting said inner edges of said tire retaining walls and cooperating with said tire retaining walls so as to confine a tire receiving space thereamong; and left and right spoke mounting flanges, each of which includes a lateral portion that extends laterally from said outer edge of a respective one of said tire retaining walls and outwardly of said tire receiving space, and an inclined portion that interconnects a distal end of said lateral portion and said intermediate portion of the respective one of said tire retaining walls, said lateral portion and said inclined portion being formed with a plurality of aligned spoke fastening holes therethrough for mounting of the spokes thereon.

* * * * *